US008680181B2

(12) United States Patent
Aberle et al.

(10) Patent No.: US 8,680,181 B2
(45) Date of Patent: Mar. 25, 2014

(54) PROCESS TO HYDROPHOBIZE CEMENT-FREE MORTARS

(75) Inventors: Thomas Aberle, Nottwil (CH); Paul Emmenegger, Oberkirch (CH); Robert Koelliker, Oberkirch (CH)

(73) Assignee: Akzo Nobel Chemicals International B.V., Amersfoort (NL)

( * ) Notice: Subject to any disclaimer, the term of this patent is extended or adjusted under 35 U.S.C. 154(b) by 0 days.

(21) Appl. No.: 13/577,567

(22) PCT Filed: Feb. 7, 2011

(86) PCT No.: PCT/EP2011/051701
§ 371 (c)(1),
(2), (4) Date: Aug. 7, 2012

(87) PCT Pub. No.: WO2011/098412
PCT Pub. Date: Aug. 18, 2011

(65) Prior Publication Data
US 2012/0309875 A1    Dec. 6, 2012

Related U.S. Application Data

(60) Provisional application No. 61/305,324, filed on Feb. 17, 2010.

(30) Foreign Application Priority Data

Feb. 9, 2010    (EP) .................................... 10153045

(51) Int. Cl.
*C04B 16/04*    (2006.01)
*C04B 26/04*    (2006.01)

(52) U.S. Cl.
USPC .............................................. 524/2; 106/500

(58) Field of Classification Search
USPC .......................................... 524/3, 2; 106/500
See application file for complete search history.

(56) References Cited

U.S. PATENT DOCUMENTS

| | | | |
|---|---|---|---|
| 1,975,787 A | 10/1934 | Hansen | |
| 2,610,130 A | 9/1952 | Riddell et al. | |
| 2,717,830 A | 9/1955 | Bjorkman | |
| 2,957,774 A | 10/1960 | Selbe et al. | |
| 3,277,072 A | 10/1966 | Patrick et al. | |
| 3,758,451 A | 9/1973 | Weymann | |
| 3,929,703 A | 12/1975 | Weymann et al. | |
| 5,623,011 A | 4/1997 | Bernard | |
| 5,994,438 A | 11/1999 | Geissler et al. | |
| 6,242,512 B1 | 6/2001 | Figge et al. | |
| 7,972,424 B2 | 7/2011 | Bastelberger et al. | |
| 2009/0110946 A1* | 4/2009 | Martin et al. | 428/537.7 |
| 2009/0223416 A1 | 9/2009 | Aberle et al. | |
| 2010/0119851 A1* | 5/2010 | Giessler-Blank et al. | 428/447 |

FOREIGN PATENT DOCUMENTS

| | | | |
|---|---|---|---|
| DE | 4124441 A1 | 1/1993 | |
| DE | 4131939 A1 | 4/1993 | |
| DE | 10323205 A1 | 12/2004 | |
| EP | 0384322 A1 | 8/1990 | |
| EP | 0799876 A2 | 10/1997 | |
| EP | 874871 B1 | 9/1999 | |
| EP | 0784650 * | 6/2000 | ............. C09J 133/08 |
| EP | 1767506 A1 | 3/2007 | |
| GB | 303935 A | 1/1929 | |
| GB | 559761 A | 3/1944 | |
| GB | 1094139 A | 12/1967 | |
| GB | 1265802 A | 3/1972 | |
| JP | S55084499 A | 6/1980 | |
| JP | H04304268 A | 10/1992 | |
| JP | 2005/187597 A | 7/2005 | |
| WO | WO 9109743 A1 | 7/1991 | |
| WO | WO 9605248 A1 | 2/1996 | |
| WO | WO 97/26295 A1 | 7/1997 | |
| WO | WO 97/26307 A1 | 7/1997 | |
| WO | WO 2007012316 A1 | 2/2007 | |
| WO | WO 2008059034 A1 | 5/2008 | |
| WO | WO 2009/058292 A1 | 5/2009 | |
| WO | WO 2010/052201 A1 | 5/2010 | |

OTHER PUBLICATIONS

Tacolyn 1070 Product Data Sheet. Mar. 2009.*
International Search Report of Corresponding International Pat. App. No. PCT/EP2011/051701 mailed Jul. 6, 2011.
European Search Report of Corresponding European Pat. App. No. EP 10153045.9 dated Aug. 2, 2010.
International Preliminary Report on Patentability of Corresponding International Pat. App. No. PCT/EP2011/051701 mailed Feb. 14, 2012.
Eastman Product Data Sheet "Tacolyn 1070 Resin Dispersion" dated Mar. 4, 2009.
English abstract of DE4131939, Apr. 1993.
English abstract of JPH04304268 A, Oct. 1992.
English abstract of JP2005187597 A, Jul. 2005.
English abstract of JPS55084499 A, Jun. 1980.
Machine translation of DE 4124441 A1, Jan. 1993.

* cited by examiner (Continued)

*Primary Examiner* — John Uselding
(74) *Attorney, Agent, or Firm* — Robert C. Morriss

(57) ABSTRACT

The present invention provides a process to hydrophobize a mortar which is essentially free of cement, comprising the steps of mixing the mortar with an additive and water and subsequently allowing the mortar to cure, wherein the additive contains a component which is a rosin, a rosin derivative, a mixture of a resin with a rosin, or a mixture of a resin with a rosin derivative, wherein when the softening point of the component is higher than 60° C., the curing step is performed at a temperature that is not lower than the softening point of the component minus 20° C. and when the softening point of the component is 60° C. or lower, the curing step is performed at 40° C. or lower, and wherein the rosin and/or rosin derivative have an acid number of at least 50 mg KOH/g, and when the component is a mixture of a resin with a rosin, or a mixture of a resin with a rosin derivative, the resin at 23° C. and pH 7 has a water solubility of about 5 g/l or less and a Brookfield viscosity of less than 20,000 mPas, measured at 23° C. and 20 rpm. The invention also covers an additive as well as a pasty and a dry mortar composition.

11 Claims, No Drawings

PROCESS TO HYDROPHOBIZE CEMENT-FREE MORTARS

This application is a national stage filing under 35 U.S.C. §371 of PCT/EP2011/051701, filed Feb. 7, 2011, which claims priority to european Patent Application No. 10153045.9, filed Feb. 9, 2010, and U.S. Provisional Patent Application No. 61/305,324, filed on Feb. 17, 2010, the contents of which are incorporated herein by reference in their entirety.

The invention relates to a process to hydrophobize mortar which is essentially free of cement, to a new additive for addition to mortars, and to pasty and dry mortar compositions containing the additive.

Mortars which are essentially free of cement have become more and more popular in recent years. Gypsum, in particular in the form of minerally setting calcium sulfate such as α- and β-hemihydrate or in the form of anhydrite I, II or III, is a very common building raw material and is applied in a plurality of widely different formulations and embodiments, such as for instance in drywall installation, where gypsum plasterboard is often used, in plastering for indoor use, in tile adhesives, in the flooring area, as well as in the handyman or do-it-yourself segment.

A major drawback to minerally setting gypsum materials, however, is their sensitivity to water, which precludes exterior applications and those in rooms with increased atmospheric moisture such as wet cells.

For that reason it has been tried time and again to formulate gypsum products in such a way that the cured gypsum products have a hydrophobizing nature and/or reduced water absorption, in order to increase their water resistance.

A number of technologies to overcome the above problem have been described. Most typically, they are based on silicon-based materials, such as silanes, siloxanes, alkoxysilanes and/or organosilanes as hydrophobizing components. In order to achieve sufficient hydrophobicity, use needs to be made of an alkaline pH-value of, e.g., the minerally setting gypsum materials.

However, it has proved to be a major drawback when the pH-value of the mixed formulation is set as alkaline, since as a result for instance organic polymeric binders saponify and so lose their adhesive strength. In addition, paper, cardboard, and wood can undergo major colour changes because of a too high pH-value of the alkaline formulation. When, by contrast, a neutral pH-value is employed, it turns out that existing materials offer insufficient water resistance and hydrophobicity.

U.S. Pat. No. 2,610,130 discloses a water-repellent gypsum product comprising a set mass of gypsum crystals protectively coated with a smaller amount of uniformly dispersed finely divided rosin and a larger amount of residual fuel oil. Residual fuel oil is the residue obtained from petroleum distillation, which, as a matter of fact, is of such a high viscosity at room temperature that it needs to be stored around 38° C. or above and it can be pumped only at 66° C. or above. Furthermore, it contains a high amount of pollutants such as sulfur. Exemplified are amounts of 1 part rosin with 5 and 10 parts residual fuel oil. The rosin and the residual fuel oil can be, e.g., added directly to the gypsum. In another embodiment, the rosin is used in the form of an aqueous dispersion, which contains up to about 3.5% of a stabilizer or emulsifying agent. In this case the residual fuel oil can either be added directly to the gypsum slurry or first be mixed with the rosin dispersion. Water-dispersible or water-redispersible powders are not mentioned.

There is a need in the building industry to provide hydrophobization of building compositions which are essentially free of cement and neutral in pH to give a significantly reduced water absorption. As ready-to-mix dry building compositions, they should be easy to mix with water. Besides, it is desirable that such products are environmentally friendly and easy to handle.

The purpose of the invention has been achieved by the provision of a process to hydrophobize a mortar which is essentially free of cement, comprising the steps of mixing the mortar with an additive and water and subsequently allowing the mortar to cure, wherein the additive contains a component which is a rosin, a rosin derivative, a mixture of a resin with a rosin, or a mixture of a resin with a rosin derivative, wherein when the softening point of the component is higher than 60° C., the curing step is performed at a temperature that is not lower than the softening point of the component minus 20° C. and when the softening point of the component is 60° C. or lower, the curing step is performed at 40° C. or lower, and wherein the rosin and/or rosin derivative have an acid number of at least 50 mg KOH/g, and when the component is a mixture of a resin with a rosin, or a mixture of a resin with a rosin derivative, the resin at 23° C. and pH 7 has a water solubility of about 5 g/l or less and a Brookfield viscosity of less than 20,000 mPas, measured at 23° C. and 20 rpm.

The process according to the invention is surprisingly versatile, straightforward, and unexpectedly flexible with respect to the temperature at which the mortar may cure. Due to the high efficiency of the additive, only small amounts of additive need to be added to obtain excellent hydrophobicity and strongly reduced water absorption, even at neutral pH. Furthermore, the process allows mixing the additive with the mortar beforehand, e.g., to obtain a dry mortar composition containing the additive. Alternatively, the additive can be mixed in at the same time that the water is added or afterwards.

The softening temperature of the additive is determined according to DIN 52011. It can be adjusted, e.g., by the type of rosin derivative and/or by the type and amount of resin mixed with the rosin or rosin derivative, making the process according to the invention flexible for use at different curing temperatures. Furthermore, resins which can be used according to the invention have a low enough viscosity at room temperature to allow easy processing of the material when making the additive.

The invention provides also a suitable additive to hydrophobize a cured mortar which is essentially free of cement, comprising a component and a stabilizer,
  a) wherein the component is a rosin derivative, a mixture of a resin with a rosin or a mixture of a resin with a rosin derivative, and has a softening point of 60° C. or lower,
  b) the rosin and the rosin derivative have an acid number of at least 50 mg KOH/g, and
  c) when the component is a mixture of a resin with a rosin, or a mixture of a resin with a rosin derivative, the resin at 23° C. and pH 7 has a water solubility of about 5 g/l or less, a Brookfield viscosity of less than 20,000 mPas, measured at 23° C. and 20 rpm, the resin being selected from the group consisting of phenol resin, polyether, polyester, ester, alcohol, ketone, and formamide resin,
wherein said additive is in the form of a water-dispersible and/or water-redispersible solid.

It is a great advantage of the present invention that the provided additive may be without a safety hazard, thus no toxic compounds need to be used when making mortar compositions containing the same. Thus hydrophobized, cured mortars containing the additive may also be without a safety hazard.

The additive according to the invention is surprisingly free-flowing, block—as well as storage-stable, and imparts good freeze-thaw stability. Furthermore, it shows an excellent wettability when getting into contact with water and it disperses and/or redisperses readily upon contact with water within a few seconds, at most through light stirring, independently if taken alone or after being mixed into the dry mortar composition.

Since the additive according to the invention is in the form of a water-dispersible and/or -redispersible solid, it is advantageously possible to work it into dry mortar compositions already at the dry-mortar-mix factory, which enables exact dosing and a homogeneous distribution and makes the preparation thereof particularly simple and economical. For use, the dry mortar compositions then only have to be mixed with the corresponding amount of water and applied. This brings with it many advantages, such as for instance simple handling, simplified logistics and/or freeze-thaw resistance of the formulation. Dry mortar compositions which are essentially free of cement and contain the additive are therefore most typically mixed with water only shortly before their application.

The invention provides also a pasty mortar composition which is essentially free of cement and contains an additive, wherein the additive contains a component which is a rosin derivative, a mixture of a resin with a rosin, or a mixture of a resin with a rosin derivative, and
  a) the component has a softening point of 60° C. or lower,
  b) the rosin and the rosin derivative have an acid number of at least 50 mg KOH/g, and
  c) when the component is a mixture of a resin with a rosin, or a mixture of a resin with a rosin derivative, the resin at 23° C. and pH 7 has a water solubility of about 5 g/l or less, a Brookfield viscosity of less than 20,000 mPas, measured at 23° C. and 20 rpm, the resin being selected from the group consisting of phenol resin, polyether, polyester, ester, alcohol, ketone, and formamide resin.

Additionally, the invention provides a dry mortar composition which is essentially free of cement and contains an additive, wherein the additive contains a component and a stabilizer, the component being a rosin derivative, a mixture of a resin with a rosin, or a mixture of a resin with a rosin derivative, and
  a) the component has a softening point of 60° C. or lower,
  b) the rosin and the rosin derivative have an acid number of at least 50 mg KOH/g, and
  c) when the component is a mixture of a resin with a rosin, or a mixture of a resin with a rosin derivative, the resin at 23° C. and pH 7 has a water solubility of about 5 g/l or less and a Brookfield viscosity of less than 20,000 mPas, measured at 23° C. and 20 rpm, wherein the resin is selected from the group consisting of phenol resin, polyether, polyester, ester, alcohol, ketone, and formamide resin,
wherein said additive is in the form of a water-dispersible and/or -redispersible solid.

It was surprisingly found that the mortars obtained by the process according to the invention as well as the pasty and the dry mortar compositions according to the invention, although they can be easily wetted and mixed with water in the uncured state, in the cured state impart a distinct hydrophobic surface which repels water and has a reduced water absorption, even at neutral pH of the mortar. Furthermore, also the cured mortar mass becomes hydrophobized. This is a particular advantage when the surface of the mortar is damaged, since the formed crack still repels water. The achieved reduction of the water absorption according to EN 520—depending on the mortar formulation and the amount of additive mixed into the mortar—typically is at least about 25 wt. %, preferably at least about 50 wt. %, in particular at least about 75 wt. % and more, compared to the cured mortar composition without the additive according to the invention.

It should be noted that US 2009/110946 describes a moisture-resistant gypsum composition comprising gypsum and a resin dispersion comprising at least one resin, a surfactant, and water. The resin in one embodiment may be a natural or modified rosin, esters of natural and modified rosins, polyterpene resins, hydrocarbon resins. The presence of a rosin or rosin derivative is optional and the document is silent on the acid number of these components. The resin may have a Ring and Ball softening point of about 10 to 150° C. However, it is neither mentioned that the curing temperature should have any relation to the softening point, nor that the softening point of the whole mixture of the resin and rosin composition combined with choosing the right curing temperature is relevant for achieving a good moisture resistance effect and the other advantageous properties of the building composition. Actually, the moisture resistance effect achieved in this document is quite poor and subject to improvement. Finally, water redispersible powders are not disclosed either.

It should be noted that EP 1 767 506 A1 claims a water-redispersible powder suitable for the reduction of efflorescence in hydraulically setting systems based on an organic component, which powder can be colophony, and a water-soluble organic polymeric protective colloid capable of forming a stable dispersion with the organic component in water. Examples disclose the addition of colophony having a softening point of about 85° C. to a heated aqueous polyvinyl alcohol solution, followed by spray drying to obtain a water-redispersible powder. Besides reducing efflorescence, it also shows some limited hydrophobicity in cementitious systems. The powder can be used in gypsum-based renders, but it is neither disclosed nor suggested that it can hydrophobize mortars which are essentially free of cement.

Additionally, it should be noted that WO 97/26295 A1 discloses a redispersible dispersion powder composition containing at least a water-insoluble synthetic polymerizate and a water-soluble spray colloid. The spray colloid is a low-molecular, non-neutralized polymerizate of olefinically unsaturated carbonic acids and the like. One example mentions a combination of a synthetic polymer dispersion and a tackifier, the latter being a mixture of a phenol ether and a Central American balsam resin of the Maya type. The phenol ether at 20° C. has a water solubility of 10 to 50 g/l. There is no disclosure of a combination of the tackifier with a stabilizer, aqueous dispersion and/or redispersible dispersion powders obtained therefrom. The compositions are used to increase wet abrasions of, e.g., powder paints, but it is not mentioned that mortars which are essentially free of cement can be hydrophobized.

Further documents, like U.S. Pat. Nos. 3,929,703, 3,758,451 and U.S. Pat. No. 3,277,072, disclose disproportionated rosin or derivatives thereof and compositions containing the same. However, aqueous disperions containing a stabilizer as well as water-dispersible or water-redispersible solids are not disclosed. Additionally, the rosin and rosin derivatives are used for example as tackifiers in adhesives, but none of the documents discloses their use in hydrophobizing mortars based on e.g. gypsum. U.S. Pat. No. 5,623,011 discloses a pressure-sensitive adhesive comprising an emulsion polymer and a tackifier, wherein the tackifier may contain a hydrocarbon resin and a rosin-based resin compound, but this document also discloses neither water-dispersible or water-redispersible solids, nor mortars.

Furthermore, it is noted that EP 0 799 876 A2 discloses an adhesive composition in powder form containing a polymerizate, e.g., a vinyl ester polymerizate, a tackifying rosin or resin, protective colloids, and anticaking aids. Disclosed as tackifying rosin are glycol esters and glycerin esters of colophony. The composition is used to make porous and semi-porous substrates stick together.

These prior art references do not disclose a process to hydrophobize cement-free mortars. Furthermore, no mention is made of an additive, suitable to hydrophobize mortars which are essentially free of cement, containing a rosin derivative, a mixture of a resin with a rosin or a mixture of a resin with a rosin derivative, the resin being selected from the group of phenol resin, polyether, polyester, ester, alcohol, ketone, and formamide resin, or mortar compositions containing the same.

The additive of the invention contains a component which is rosin, a rosin derivative, a mixture of a resin with a rosin, or a mixture of a resin with a rosin derivative. According to the invention, rosin, also called colophony or greek pitch, can be obtained from pines and some other plants, mostly conifers. It consists mostly of different resin acids which contain a carboxyl group and double bonds. Their most typical molecular formula is $C_{19}H_{29}COOH$, which occurs in a number of isomeric forms. The most prevalent resin acids are based on abietic-type acids and pimaric acid. The most typical abietic-type acids are abietic acid, including abieta-7,13-dien-18-oic acid and 13-isopropylpodocarpa-7,13-dien-15-oic acid, neoabietic acid, dehydroabietic acid, palustric acid, and levopimaric acid. The most typical pimaric-type acids are pimaric acid, including pimara-8(14),15-dien-18-oic acid, and isopimaric acid.

Rosin has a softening point according to DIN 52011 of around 85° C. and an acid number, which can be determined according to DIN EN ISO 2114, of about 180 to 200 mg KOH/g. The acid number is expressed as amount of potassium hydroxide in milligrams needed to neutralize the acids in one gram of rosin or rosin derivative.

The rosin can also be derivatized or functionalized to give the rosin derivative. The person skilled in the art is aware of suitable functionalization as well as how to obtain the respective products.

A non-limiting list of suitable groups to functionalize the rosin includes alkyl ester and alkyl ether groups, in particular $C_1$ to $C_{22}$ alkyl ester groups, alkoxylated ester and ether groups with alkoxy groups having alkyl and/or hydroxyalkyl end groups, with the alkoxy group preferably being a $C_1$ to $C_4$ alkoxy group. Furthermore, the rosin can be functionalized with one or more carboxyl, sulfo, epoxide, maleic acid, fumaric acid, phenol-modified rosin esters and ethers, triethylene glycol esters, penta esters, glycerol esters, salicyl alcohol, 2-hydroxybenzyl alcohol, and/or acrylic groups. In addition, the rosin derivative can be a disproportionated rosin, a hydrogenated rosin, a metal rosinate, the metal being in particular calcium or zinc, a styrenated rosin and/or an oxidized rosin.

Preferably, the rosin and/or rosin derivative are insoluble or hardly soluble in water at 23° C. and pH 7, which corresponds with a water solubility of 5 g/l or less, preferably 3 g/l or less, in particular of about 1 g/l or less.

According to the invention, the rosin derivatives preferably have an acid number according to DIN EN ISO 2114 of about 75 mg KOH/g or higher, in particular of about 100 mg KOH/g or higher.

The component may also contain one or more resins. The resin can be of a synthetic or natural nature, the latter can also be synthetically modified. According to the invention, the resin has a Brookfield viscosity, measured at 23° C. and 20 rpm according to the DIN 53019 standard, of preferably about 10,000 mPas or lower, in particular of about 5,000 mPas or lower. It is noted that the determination of the viscosity of a liquid using a Brookfield viscosimeter is a well established method and choosing the proper size of the spindle depends on the viscosity of the material being measured. The person skilled in the art is well aware of all the particulars.

Furthermore, it may be advantageous when the water solubility of the resin at 23° C. and pH 7 is about 3 g/l or less, preferably about 1 g/l or less, and when the boiling point of the resin at 760 mm Hg is about 250° C. or higher. If the resin is a synthetic resin, its molecular weight advantageously is about 150 or higher, preferably about 200 or higher, in particular about 300 or higher.

Resins according to the invention include hemiterpenes, monoterpenes, sesquiterpenes, phenol resins, organosilicon compounds, polyethers, polyesters, esters, alcohols, ketones, amides, hydrocarbons as well as formamide resins, the alcohol preferably being an aromatic alcohol and the phenol resin preferably being a phenol derivative, in particular a styrenated phenol with mono-, di-, tri-substitute styrenated phenol being most preferred. The polyether and polyester preferably have a degree of polymerization of at least 2, in particular of at least 5. If the resin contains hydroxyl groups, such as, e.g., the phenol and/or alcohol resins, it preferably has an OH content of at least 2 wt. %, e.g. in accordance with ISO 4630. Residual fuel oil is not a resin according to the invention. Organosilicon compounds are less preferred resins. Particularly preferred resins are hemiterpenes, monoterpenes, sesquiterpenes, phenol resins, esters, and alcohols.

Non-limiting examples of hemiterpenes include prenol, 3-methyl-3-buten-2-ol, tiglinic acid, angelicic acid, senecioic acid, and isovaleric acid. Non-limiting examples of monoterpenes include acyclic, monocyclic, and bicyclic monoterpenes, such as camphor, camphoric acid, isonitrosocamphor, camphor quinone, menthol, limonene, pinene, camphor carboxylic acid and/or alkyl hydroxyl methylene camphor. Non-limiting examples of sesquiterpenes include acyclic, monocyclic, and polycyclic sesquiterpenes.

In one preferred embodiment, the component according to the invention is the tree gum or natural gum itself, which is otherwise used as raw material to obtain colophony. These gums can be seen as the natural mixture of colophony with natural resins such as hemiterpenes, monoterpenes and/or sesquiterpenes.

If one or more resins are used, the weight ratio of the resin to the rosin and/or rosin derivative is typically between about 70:30 and 2:98, preferably between about 60:40 and 10:90, and in particular between about 50:50 and 20:80.

The additive can further contain a stabilizer, which is preferably a surfactant and/or a water-soluble polymer, even more preferably a water-soluble polymer. The addition of such a stabilizer allows an aqueous dispersion and/or a redispersible solid to be formed. The latter is preferably in the form of a powder and/or granulate.

The surfactant can be of a nonionic, anionic, cationic and/or amphoteric nature. Preferred surfactants are alkyl sulfonates, alkylaryl sulfonates, alkyl sulfates, sulfates of hydroxy alkanols, alkyl and alkylaryl disulfonates, sulfonated fatty acids, sulfates and phosphates of polyethoxylated alkanols and alkyl phenols, as well as esters of sulfoambric acid, quaternary alkyl ammonium salts, quaternary alkyl phosphonium salts, polyaddition products such as polyalkoxylates, for example adducts of 5 to 50 mol of ethylene oxide and/or propylene oxide per mol of linear and/or branched $C_6$ to $C_{22}$ alkanols, alkyl phenols, higher fatty acids, higher fatty acid amines, primary and/or secondary higher alkyl amines, wherein the alkyl group in each case preferably is a linear and/or branched $C_6$ to $C_{22}$ alkyl group. The person skilled in the art is aware of how to select the most suitable surfactant.

The water-soluble polymer preferably is a synthetic polymer or a biopolymer, which can also be synthetically modified. Preferred classes of biopolymers are polysaccharides, peptides and/or proteins, which may have been prepared naturally and/or synthetically.

Non-limiting examples of biopolymers are cold water-soluble polysaccharides and polysaccharide ethers such as cellulose ethers, starch ethers (amylose and/or amylopectin and/or their derivatives), guar ethers, dextrins and/or alginates, heteropolysaccharides which may have one or more anionic, nonionic or cationic groups, such as xanthan gum, welan gum and/or diutan gum. Chemically modified polysaccharides may contain carboxymethyl, carboxyethyl, hydroxyethyl, hydroxypropyl, methyl, ethyl, propyl, sulfate, phosphate and/or long-chain alkyl groups. Preferred peptides and/or proteins are gelatine, casein and/or soy protein. Particularly preferred biopolymers are dextrins, starches, starch ethers, casein, soy protein, gelatine, hydroxyalkyl-cellulose and/or alkyl-hydroxyalkyl-cellulose, wherein the alkyl group may be the same or different and preferably is a $C_1$- to $C_4$-group, in particular a methyl, ethyl, n-propyl- and/or i-propyl group.

Non-limiting examples of synthetic, water-soluble organic polymers are polyvinyl pyrrolidone and/or polyvinylacetals with a molecular weight of 2,000 to 400,000, fully or partially saponified polyvinyl alcohols and their derivatives, which can be modified for instance with amino groups, carboxylic acid groups and/or alkyl groups, with a degree of hydrolysis of preferably about 70 to 100 mol. %, in particular of about 80 to 98 mol. %, and a Höppler viscosity as 4% aqueous solution of preferably 1 to 100 mPas, in particular of about 3 to 50 mPas (measured at 20° C. in accordance with DIN 53015), as well as melamine formaldehyde sulfonates, naphthalene formaldehyde sulfonates, polymerizates of propylene oxide and/or ethylene oxide, including their copolymerizates and block copolymerizates, styrene-maleic acid and/or vinyl ether-maleic acid copolymerizates. Particularly preferred are partially saponified polyvinyl alcohols, which optionally may be modified, with a degree of hydrolysis of 80 to 98 mol. % and a Höppler viscosity as 4% aqueous solution of 1 to 50 mPas and/or polyvinyl pyrrolidone.

If one or more stabilizers are used, the weight ratio, based on their solids content, of the stabilizer to the component, e.g., rosin or rosin derivative and/or a mixture of a resin with a rosin and/or a rosin derivative, is preferably between about 1:2 and 1:25, in particular between about 1:3 and 1:20.

The additive according to the invention as well as the process according to the invention contains a component and preferably a stabilizer. If the component is a mixture of a resin with a rosin and/or a rosin derivative, the mixture may be obtained by heating it up, e.g., at or above the softening point of the rosin and/or rosin derivate. Stirring during and/or after the melting process helps to obtain a homogeneous phase of the mixture more rapidly.

When the additive contains a stabilizer, it can form an aqueous dispersion. The component, the stabilizer, and water are mixed together, e.g., by means of batch and/or continuous mixing. The component can be in the molten or the solid state. It is also possible to mix first one part of the component, e.g., the rosin or rosin derivative, with all or a part of the stabilizer and with all or a part of the water, followed by adding the remainder of the component, stabilizer and/or water. Applying heat during and/or after any mixing process may be preferred. The mean volumetric particle size distribution of the aqueous dispersion may be between about 0.05 µm and 50 µm, preferably between about 0.2 and 20 µm, measured by light scattering or light diffraction, techniques which are well known by the person skilled in the art. The solids content of the dispersion can be up to about 80 wt. %, preferably up to about 70 wt. %, based on the total weight of the aqueous dispersion containing the water, the component, and the stabilizer. The solids content may be as low as 5 wt. % or lower, but it is often preferred when it is about 30 wt. % or higher. A particularly preferred solids content is between about 45 and 65 wt. %.

When the additive is in the form of a water-dispersible and/or water-redispersible solid, it is preferably in the form of a powder or granulate. It can be obtained by drying the aqueous dispersion containing the component and the stabilizer. It may be preferred to add further stabilizers, in particular further water-soluble polymer, to the aqueous dispersion before drying. The additionally added stabilizers can be the same as or different from the ones used to make the aqueous dispersion. In one preferred embodiment, the additionally added stabilizers are water-soluble polymers, with partially saponified polyvinyl alcohols and/or polyvinyl pyrrolidone being particularly preferred.

The drying can take place by means of every suitable process. Preferred are spray drying, freeze drying, fluidized bed drying, drum drying, granulation such as for instance fluid bed granulation and/or rapid drying, with spray drying being especially preferred. Spray drying can take place for instance by means of a spraying wheel or a one-component or multi-component nozzle. If necessary, the mixture to be dried can still be diluted with water, in order to achieve a suitable viscosity for the drying. The drying temperature in principle has no real limits. However, because of safety-related considerations, the temperature of the inlet gas should not, as a rule, exceed about 200° C., in particular about 175° C. In order to attain sufficiently efficient drying, temperatures of about 110° C. or higher, in particular of about 120° C. or higher, are often preferred.

The mean volumetric particle size of the thus obtained water-dispersible and/or water-redispersible solids is preferably less than about 5 mm, in particular less than about 2 mm, but in general at least about 10 µm or higher. In particular, granulates have a preferred mean volumetric particle size of about 0.05 mm or higher, in particular of about 0.1 mm or higher. The preferred mean volumetric particle size for powders is between about 20 µm and about 500 µm, in particular between about 50 µm and about 250 µm.

The mortar according to the invention can be, in its uncured form, a one-, two- or even multi-component mortar. One-component mortars include pasty mortar compositions and dry mortar compositions, two- and multi-component mortars are mortar systems containing generally a dry component, which is, e.g., gypsum-based, and a liquid component. The liquid component typically contains water-based ingredients. When the additive according to the process of the invention is in the liquid form, e.g., an aqueous dispersion, it is preferably added either to the liquid component of a two- or multi-component mortar system or to a pasty mortar composition. When the additive according to the process of the invention is in the form of a water-dispersible or water-redispersible solid, it is preferably added to a dry mortar composition. However, it also can be added to a liquid component or to a pasty mortar composition.

Dry mortars are mortars that are well known to the person skilled in the art and have to be mixed with water before application. Pasty mortars are also well known to the person skilled in the art. They already contain the required amount of water and can be applied as such.

By curing is meant the removal of free, unbound water by, e.g., evaporation, absorption by a substrate and/or by reaction with, e.g., a mineral binder to become, e.g., part of a crystal structure. Thus, according to the invention, a cured mortar is not only hydrophobized, but is also in the solid state and thus imparts certain physical properties. Specifics are well known to the person skilled in the art and may vary for different applications.

When the temperature of the curing step, also called the curing temperature, of the mortar is 40° C. or lower, the softening point of the component preferably is 50° C. or lower. For curing temperatures higher than 40° C. the softening point of the component preferably is at most 10° C. above the curing temperature. When the curing temperature is not one single temperature, it refers to the highest temperature at or above which the process is kept for at least 10 minutes.

In one embodiment, curing can occur at different temperatures, e.g., in a first step at room temperature, followed by a second step at elevated temperature. The second step can also occur later, e.g., days after the first curing step.

Mortars (which unless specified differently stands for uncured mortars) containing the additive after the step of mixing with the additive and water but before the curing step have typically a pH of about 10 or lower at room temperature, preferably of about 9 or lower. Most preferably, the pH is between about 6 and about 8, and thus about neutral. If it should not be possible to determine the pH of the mortar after the step of mixing with the additive and water, the mortar containing the additive can be mixed with the same weight amount of water, followed by measuring the pH of said mixture.

Due to the high efficiency of the additive only small amounts need to be added to obtain the sought hydrophobicity. Typically, the additive is mixed into the mortar formulation in an amount such that the mortar contains the additive in an amount of about 0.1 to about 10 wt. %, preferably in an amount of about 0.3 to about 5 wt. %, and in particular in an amount of about 0.5 to about 3 wt. % of solids, based on the sum of the solids of the uncured mortar and the additive. Mortars according to the process of the invention, as well as pasty and dry mortar compositions according to the invention which are essentially free of cement, may contain mineral binders. They are typically solids and are selected from the group of a) a hydraulically setting binder that is not cement, in particular, activated blast furnace slags and/or silico-calcareous fly ash, b) a latent hydraulic binder, such as in particular pozzolanes and/or metakaolin, which reacts hydraulically in combination with a calcium source such as calcium hydroxide and/or cement, and/or c) a non-hydraulic binder which reacts under the influence of air and water, in particular gypsum, by which is meant in this invention in particular calcium sulfate in the form of α- and/or β-semihydrate and/or anhydrite of form I, II and/or III, calcium hydroxide, calcium oxide, quicklime, hydrated lime, magnesia cements and/or water glass.

Mortars which are essentially free of cement may contain, in the context of this invention, a small amount of, e.g., up to about 5 wt. % cement. However, preferably they contain less than about 3 wt. %, in particular less than about 1 wt. %, based on the dry total weight of the uncured mortar formulation. In one preferred embodiment they even contain no cement at all. Cement stands for Portland cement in accordance with EN 197-1 CEM I, II, III, IV, and V, as well as calcium phosphate cement and/or aluminous cement such as calcium aluminate cement and calcium sulfo-aluminate cement. Gypsum stands for calcium sulfate in the form of α- and/or β-semihydrate and/or anhydrite of form I, II and/or III.

Preferred latent hydraulic binders are pozzolanes, metakaolin, burnt shale, diatomaceous earth, moler, rice husk ash, air cooled slag, calcium metasilicate and/or vulcanic slag, vulcanic tuff, trass, fly ash, silica fume, fumed silica, microsilica, blast-furnace slag, and/or silica dust.

Preferred non-hydraulic binders are gypsum, calcium hydroxide, calcium oxide, lime such as quicklime and/or hydrated lime, magnesia cements and/or water glass.

If mineral binders are added which in water lead to an alkaline or acidic pH, it is preferred to add only small amounts which have no or only a slight effect on the pH of the mortar. Thus, it is preferred that the mortars—when the dry components are mixed with the same amount of water—have a pH between 3 and 10, preferably between 4 and 9, when measured at 23° C.

In one preferred embodiment the uncured mortar is a gypsum-based composition. Such compositions as a rule have a proportion of gypsum of at least 70 wt. %, in particular of at least 90 wt. %, calculated on the overall proportion of mineral binder. This translates to at least 15 wt. %, preferably at least 20 wt. %, in particular at least 35 wt. %, and may be as high as, e.g., 90 wt. % or higher, of gypsum, calculated on the dry content of the total composition.

Such gypsum-based mortar compositions preferably contain about 15 to 99 wt. %, in particular about 20 to 90 wt. %, of at least one type of gypsum, about 1 to 80 wt. %, in particular about 10 to 75 wt. %, of at least one mineral filler, and about 0.1 to 10 wt. %, in particular about 0.2 to 5 wt. %, of the additive according to the invention or of the additive of the process according to the invention, as well as up to about 5 wt. %, in particular up to about 3 wt. %, of further additives such as for instance polysaccharide ethers such as cellulose ethers and the alkyl and/or hydroxyalkyl derivatives thereof, retardants and/or accelerators, surface-active substances such as defoamers and/or wetting agents, and water-redispersible polymer powders, also called redispersion powders, and further additives known to the skilled person. All amounts are based on the dry, uncured total mortar composition.

In another preferred embodiment, the mortar is a so-called cement-free and gypsum-free mortar, but it may contain another mineral binder, in particular a latent hydraulic binder, although other hydraulic and/or non-hydraulic binders can also be used, often in small amounts.

In yet another preferred embodiment, the mortar contains no mineral binder or less than 5 wt. %, preferably less than 3 wt. %, in particular less than 1 wt. % thereof, calculated on the dry content of the total formulation. These formulations preferably contain non-mineral binders. They are typically organic binders, in particular water-soluble and/or water-dispersible polymers such as film-forming dispersions and/or redispersible powders based on emulsion polymers, as well as epoxide resins. Upon reaction or upon water evaporation these organic binders typically form water-insoluble films.

Such mortar compositions preferably contain about 50 to 98 wt. %, in particular about 60 to 95 wt. %, of at least one mineral filler, about 0.1 to 10 wt. %, in particular about 0.2 to 5 wt. %, of the additive according to the invention or of the additive of the process according to the invention, about 2 to 40 wt. %, in particular about 5 to 30 wt. %, of an organic polymer binder capable of forming water-insoluble films, which is preferably in the form of an aqueous polymer dispersion and/or water-redispersible polymer powder, as well as up to about 15 wt. %, in particular up to about 10 wt. %, of further additives, such as for instance polysaccharide ethers such as cellulose ethers and the alkyl and/or hydroxyalkyl derivatives thereof, cellulose fibres, retardants and/or accelerators, surface-active substances such as defoamers and/or wetting agents, optionally minerally setting binders, as well as further additives known to the skilled person. All amounts are based on the dry, uncured total mortar composition.

In one embodiment the pasty mortar compositions are free of mineral binders. Dry mortar compositions may contain mineral binders or not. Preferred dry mortar compositions containing mineral binders are dry gypsum mortars. Their proportion of gypsum, calculated on the dry mortar, is at least about 35 wt. %, based on the dry, uncured mortar formulation.

The mortars may contain mineral fillers, also called aggregates, which are well known to the skilled person. Non-limiting examples are quartzitic and/or carbonatic sands and/or powders such as for instance quartz sand and/or carbonates, silicates, chalks, layered silicates and/or precipitated silicas. Furthermore, use may be made of light-weight fillers such as for instance hollow microspheres of glass, alumo silicates, silica, aluminium-silica, calcium-silicate hydrate, aluminium-silicate, magnesium-silicate, aluminium-silicate hydrate, calcium-aluminium-silicate, calcium-silicate hydrate silica, and/or aluminium-iron-magnesium-silicate, but also of clays such as bentonite, in which case the fillers and/or light-weight fillers can also have a natural or artificially generated colour. Furthermore, the mortars may also contain organic fillers such as polymers, e.g. polystyrene spheres.

The pasty mortar composition as well as the dry mortar composition according to the invention can be formulated as, e.g., a coating or composite mortar, a formulation to make plaster boards, in particular gypsum plaster boards, a thermal insulation mortar, sealing compound, gypsum and/or gypsum-lime plaster, repair mortar, finish mortar, joint adhesive, joint filler, joint sealer, tile adhesive, in particular a ceramic tile adhesive, construction adhesives, an adhesive mortar, plywood-mortar, mortar for mineral bonding agents, primer, concrete coating mortar, powder coating, parquet adhesive, stucco work and/or moulding plaster composition, skim coats, a levelling compound, smoothing mortar and/or screed, in particular a gypsum screed. Thanks to the hydrophobicity and low water absorption obtained by the addition of the additive according to the invention, such mortars can be used in the outdoor as well as the indoor area. Preferably, they are used in drywall installation, in plastering, in the handyman and do-it-yourself area.

The additive according to the invention and according to the process of the invention may contain further adjuvants. Liquid adjuvants are preferably added to the aqueous dispersion, e.g., before drying said dispersion. Powdered adjuvants may be added to the water-dispersible or water-redispersible solid or to the aqueous dispersion.

Preferred further adjuvants are antifoaming agents, wetting agents, alkyl, hydroxyalkyl and/or alkyl hydroxyalkyl polysaccharide ethers such as cellulose ethers, starch ethers and/or guar ethers, with the alkyl and the hydroxyalkyl group typically being a $C_1$- to $C_4$-group, synthetic polysaccharides such as xanthan gum or welan gum, cellulose fibres, dispersing agents, rheology control additives, in particular superplasticizers, thickeners and/or casein, set-control agents such as accelerators and/or retarders, air entraining agents, polycarboxylate ethers, polyacrylamides, fully and/or partially saponified, and optionally modified, polyvinyl alcohols, polyvinyl pyrrolidones, polyalkylene oxides and polyalkylene glycols, with the alkylene group typically being a $C_2$- and/or $C_3$-group, to which belong also block copolymerizates, aqueous polymer dispersions and water-redispersible polymer powders, which are based on water-insoluble film-forming polymerizates of, e.g., vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, wherein vinyl versatate preferably is a $C_4$- to $C_{12}$-vinyl ester, and the polymerizates can contain about 0-50 wt. %, in particular about 0-30 wt. %, and quite especially preferably about 0-10 wt. %, of further monomers, in particular monomers with functional groups. Furthermore, further adjuvants may be other agents for hydrophobizing and/or for reducing the water absorption capacity, in particular based on silanes, siloxanes, silicones, metal soaps, fatty acids and/or fatty acid esters, additives for reducing efflorescence, pigments, anticaking aids, fillers and/or aggregates. All these adjuvants are well known to the person skilled in the art.

Particularly preferred further adjuvants are aqueous polymer dispersions, redispersible polymer powders, water-soluble polymers, polysaccharide ethers, wetting agents, and rheology control additives.

The amount of these adjuvants added to the additive can vary within a broad range, such as, e.g., from about 0.01 wt. % or higher, in particular about 0.1 wt. % up to, e.g., the 200-fold amount or higher, based on the solid content of the adjuvant in relation to the solid content of the component.

The invention is further elucidated with reference to the following Examples. Unless indicated otherwise, the experiments were carried out and the samples applied and cured at a temperature of 23° C. and a relative humidity of 50%.

Abbreviations used:

Rosin The term "rosin" is used as an acronym for both rosin and rosin derivatives.

RO-1 The natural rosin used is colophony (supplier: Fluka) and has an acid number according to DIN EN ISO 2114 of 180 to 200 mg KOH/g and a softening point according to DIN 52011 of 85° C.

RO-2 Maleic modified natural rosin ester with an acid number according to DIN EN ISO 2114 of 201 mg KOH/g and a softening point according to DIN 52011 of 87° C. The product is not classified as a safety hazard.

RO-3 Modified natural rosin ester with an acid number according to DIN EN ISO 2114 of 131 mg KOH/g and a softening point according to DIN 52011 of 72° C. The product is not classified as a safety hazard.

RO-4 Maleic modified natural rosin ester with an acid number according to DIN EN ISO 2114 of 196 mg KOH/g and a softening point according to DIN 52011 of 84° C. The product is not classified as a safety hazard.

RE-1 Liquid organofunctional polysiloxane resin having a dynamic viscosity according to DIN 53015 of 35 mPas at 20° C. (Protectosil 266 from Degussa). The resin is water-insoluble, e.g., the water solubility at 23° C. and pH 7 is well below 1 g/l. The product is not classified as a safety hazard.

RE-2 Liquid styrenated phenol resin having a dynamic viscosity according to DIN 53019 of 400 to 1,400 mPas with a water solubility of 59 mg/l at 20° C. and pH 7 (Novares LS 500 from Rüttgers Chemicals). The product is not classified as a safety hazard.

PVOH Polyvinyl alcohol with a degree of hydrolysis of 88 mol. % and a Höppler viscosity as 4% aqueous solution of 4 mPas. The product is not classified as a safety hazard.

PVP Luvitec K17 (supplier: BASF) is a polyvinyl pyrrolidone having a molecular weight Mw (measured by GPC) of 9,000 g/mol and a Brookfield viscosity as a 40 wt. % aqueous solution of 80-180 mPas at 23° C. The product is not classified as a safety hazard.

EXAMPLE 1

Preparation of Aqueous Dispersions

For detailed compositions reference is made to Tables 1 to 6 and related text.

A total of 20 g of rosin and resin was added to a 100 ml glass vessel and stored in an oven at 100° C. After all had melted, the composition was stirred to get a homogeneous mixture. All rosin/resin mixtures referred to in Tables 1 to 6 were high viscous liquids having a softening point of 50° C. or below.

In a separate container, a 20 wt. % aqueous PVOH solution was made up according to standard procedure, which is well known to the skilled person. The appropriate amount of this PVOH solution, as indicated in Tables 1 to 6, was added to the rosin/resin mixture while agitating the system with a propeller stirrer at 1,000 rpm. Afterwards, water was added to obtain a solids content of the final dispersion of 50 wt. %, followed by allowing the dispersion to cool to room temperature. Stable whitish dispersions without grits were obtained with Brookfield viscosities at 23° C. and 20 rpm of between 500 and 3,000 mPas with a mean volumetric particle size distribution of between about 0.5 and 5.0 μm.

The same procedure was repeated, except that only a rosin or resin was added. For rosins or resins which are liquids at 23° C., the emulsification with the aqueous PVOH solution was carried out at room temperature.

EXAMPLE 2

Preparation of Powder P-1

A dispersion was made according to Example 1 containing 70 parts by weight of RO-4 and 30 parts by weight of RE-2, which was stabilized with 11.25 wt. % of PVOH, based on the sum of RO-4 and RE-2, with a solids content of 50 wt. %. The obtained mixture was mixed with 22 parts by weight of a 50 wt. % solution of PVP and further diluted with water to a solids content of 20 wt. %, followed by drying using conventional spray drying with an inlet temperature of 125° C. to a whitish, free-flowing, and readily water-redispersible powder in good yield, in which process no significant fouling occurred in the spraying tower. 100 parts by weight of the resultant powder were mixed with 12.4 parts by weight of a 91:9 mixture of commercially available calcium/magnesium carbonate and fumed silica. This example demonstrates that it is easy to prepare a powder using the technology of the present invention.

EXAMPLE 3

Preparation of Powder P-2

A dispersion was made according to Example 1 containing 70 parts by weight of RO-4 and 30 parts by weight of RE-2, which was stabilized with 11.25 wt. % of PVOH, based on the sum of RO-4 and RE-2, with a solids content of 50 wt. %. The obtained mixture was mixed with 81 parts by weight of a 20 wt. % solution of PVOH and further diluted with water to a solids content of 20 wt. %, followed by drying using conventional spray drying with an inlet temperature of 125° C. to a whitish, free-flowing, and readily water-redispersible powder in good yield, in which process no significant fouling occurred in the spraying tower 100 parts by weight of the resultant powder were mixed with 12.4 parts by weight of a 91:9 mixture of commercially available calcium/magnesium carbonate and fumed silica.

EXAMPLE 4

Preparation of a Gypsum-Based Dry Mortar Master Batch TM-1

Prepared were 5 kg of dry mortar master batch TM-1, consisting of 420 parts by weight of Almod Beta gypsum, 100 parts by weight of Alpha gypsum, 300 parts by weight of a natural calcium carbonate (Omyacarb BG10), 55 parts by weight of an aluminium-silicate (kaolin), 90 parts by weight of magnesium-aluminium-silicate hydrate (Plastorit), 20 parts by weight of a commercially available redispersible dispersion polymer powder of an ethylene-vinyl acetate copolymerizate (Elotex MP2080), 3 parts by weight of a commercially available cellulose ether, and 0.1 part by weight of a commercially available retarder (Retardan P). The components were mixed in a 10 l vessel with a FESTO stirrer until a homogeneous dry mortar master batch was obtained.

EXAMPLE 5

Preparation of Mortar Premixes

The dispersions obtained according to Example 1 or the powders obtained according to Examples 2 and 3, as indicated in Tables 1 to 6, were mixed with a sufficient amount of the mortar master batch TM-1 to make up 200 g, based on the solids content. While stirring slowly with a 40 mm propeller stirrer, this mixture was added to 84 g of water in a 500 ml beaker and further stirred for one minute with the propeller stirrer at a speed of 950 rpm. After a maturing time of 3 minutes the mortar was again stirred by hand for 15 seconds and applied.

When powders were added, they could be easily mixed into TM-1 to obtain a dry mortar composition according to the invention. They were storage stable. When mixed with water, these dry mortar compositions revealed an excellent wettability as well as miscibility.

All mortar samples when diluted with water to a solids content of 50 wt. % have a pH value of between 6.5 and 7.5. They wet easily with water, impart a good mortar workability, and they can be applied onto all typical substrates without any problems.

EXAMPLE 6

Determination of Surface Hydrophobicity

The mortar premixes from Example 5 were applied after the 3 minutes maturing time by means of 2 mm thick spacers onto 10 mm thick EPS-boards (Expanded Polystyrene; 15 kg/m$^3$) and stored at 23° C. and 50% relative humidity (RH) for 7 days. After this curing period, 5 drops (0.2 ml) of water were applied onto the mortar surface to form one water spot, followed by measuring the time until this water spot had disappeared on the surface.

On samples having a high water absorption, measured according to Example 7, the water from the water spot was absorbed completely within 3 to 4 minutes. This was the case with, e.g., reference samples having water absorption values of around 900 g/m², However, when the water absorption values were reduced to around 400 g/m² or lower, the water drop remained on the mortar surface for 5 hrs or longer, thus showing excellent surface hydrophobicity. In such event, the water disappeared rather by evaporation than by absorption into the mortar.

EXAMPLE 7

Determination of Water Absorption of Gypsum Mortars on EPS-Boards Following EN520

The mortar premixes from Example 5 were applied after the 3 minutes maturing time by means of 2 mm thick spacers onto 10 mm thick EPS-boards (Expanded Polystyrene; 15 kg/m³) and stored—unless otherwise noted—at 23° C./50% relative humidity (RH) for 7 days. After 6 days, polypropylene rings with a diameter of 83 mm and a height of 20 mm were sealed on with the aid of silicone adhesive.

The boards were weighed, with the sealed on rings subsequently being filled with 90 g of water and left for 2 hours. After removal of the remaining water the wet surface was wiped and the boards were reweighed. The water absorption was calculated by the difference in the weight values measured before and after the water treatment, which is indicated in g/m².

In Tables 1 to 5 the measured water absorption was obtained by using aqueous dispersions which were prepared according to Example 1. The relative amount of PVOH used for making the dispersions as indicated in the Tables is reported as wt. %, based on the sum of rosin and resin. The relative amounts of rosin and resin, respectively, are based on the sum of the weight of the used rosin and resin (reported as wt. %). The amount of dispersion, based on its solid content, added to TM-1 was 1.0 wt. %, calculated on the sum of the solid content of the additive and TM-1.

Using mortar premixes of TM-1 with different dispersions prepared according to Example 1, or different amounts of powder P-2 from Example 3, resulted in the experiment numbers ("Exp. No.") A-2 to A-7 (Table 1), B-1 to B-4 (Table 2), C-1 to C-5 (Table 3), D-1 to D-5 (Table 4), E-1 to E-5 (Table 5), and F-1 to F-2 (Table 6).

TABLE 1

Water absorption of gypsum mortars based on TM-1 and aqueous dispersions prepared according to Example 1. The gypsum mortars were applied on EPS-boards following EN520 and cured at 23° C., as detailed in Example 7. The rosin used was RO-1. For further details see text.

| Exp. No. | PVOH [wt. %] | Rosin [wt. %] | Resin [wt. %] | Resin type | H$_2$O abs. [g/m²] | Softening point [° C.][b] |
|---|---|---|---|---|---|---|
| A-1 (Ref) | N/A[a] | N/A[a] | N/A[a] | N/A[a] | 920 | N/A[a] |
| A-2 (Ref)[c] | 33.38 | 100 | 0 | N/A[a] | 547 | 85 |
| A-3 | 33.38 | 75 | 25 | RE-1 | 384 | <50 |
| A-4 | 33.38 | 75 | 25 | RE-2 | 273 | <50 |
| A-5 | 33.38 | 50 | 50 | RE-2 | 339 | <50 |
| A-6 (Ref) | 33.38 | 0 | 100 | RE-2 | 1095 | <50 |
| A-7 (Ref) | 33.38 | 0 | 100 | RE-1 | 873 | <50 |

[a]N/A stands for "not applicable".
[b]The softening points indicated refer to the rosin (when taken alone), the rosin/resin mixture, and the resin (when taken alone), respectively.
[c]A-2 is a reference sample, since the curing temperature of 23° C. is too low for the softening temperature of this sample (85° C.).

The results from Table 1 reveal that additives according to the invention containing a component having a softening point of 60° C. or lower and containing a rosin or rosin derivative, e.g., a mixture of a resin and rosin, significantly decrease the water absorption when only a small amount of said additive is used. Thus, the physical characteristics of the gypsum matrix do not change or change only minimally when subjected to water. However, if a rosin having a softening point of 85° C., e.g., Exp. A-2, or a resin, e.g., Exp. A-6 and A-7, is emulsified alone and the mortar is cured at 23° C., the water absorption remains too high. This allows enough water to penetrate to cause the performance of gypsum to deteriorate significantly. Although the water absorption is reduced in Exp. A-2, still too much water is allowed to absorb. The cured mortar is not sufficiently hydrophobized, which leads to significant deterioration of the physical characteristics of the cured gypsum matrix.

TABLE 2

Water absorption of gypsum mortars based on TM-1 and aqueous dispersions prepared according to Example 1. The gypsum mortars were applied on EPS-boards following EN520 and cured at 23° C., as detailed in Example 7. The amount of PVOH used was 11.25 wt. % and the resin was RE-2. For further details see text.

| Exp. No. | Rosin Type | Rosin [wt. %] | Resin [wt. %] | H$_2$O abs. [g/m²] | Softening point [° C.][a] |
|---|---|---|---|---|---|
| B-1 (Ref) | RO-2 | 100 | 0 | 695 | 87 |
| B-2 | RO-2 | 75 | 25 | 261 | <50 |
| B-3 (Ref) | RO-3 | 100 | 0 | 727 | 72 |
| B-4 | RO-3 | 75 | 25 | 227 | <50 |

[a] The softening points indicated refer to the rosin (when taken alone) and the rosin/resin mixture, respectively.

It can be seen from Table 2 that the rosin derivatives RO-2 and RO-3, both having an acid number of 131 mg KOH/g or higher and a softening point of 72° C. or higher, when emulsified without a resin have only a minor effect on the water absorption of TM-1 when cured at 23° C. However, when the rosin derivatives RO-2 and RO-3 are mixed with the resin RE-2 to obtain a component with a low enough softening point, the water absorption of sample B-2 is only 38% of that of B-1 and the water absorption of sample B-4 is only 31% of that of B-3.

TABLE 3

Water absorption of gypsum mortars based on TM-1 and aqueous dispersions prepared according to Example 1. The gypsum mortars were applied on EPS-boards following EN520 and cured at 23° C., as detailed in Example 7. The resin used was RE-2. For further details see text.

| Exp. No. | Rosin Type | Rosin [wt. %] | Resin [wt. %] | PVOH [wt. %] | H$_2$O abs. [g/m²] |
|---|---|---|---|---|---|
| C-1 | RO-1 | 75 | 25 | 33.38 | 273 |
| C-2 | RO-1 | 75 | 25 | 11.25 | 146 |
| C-3 | RO-1 | 75 | 25 | 7.5 | 167 |
| C-4 | RO-4 | 75 | 25 | 19.60 | 187 |
| C-5 | RO-4 | 75 | 25 | 11.25 | 176 |

The results from Table 3 indicate that the amount of stabilizer (e.g., PVOH) plays a minor role. Some of the differences are attributed to the lower content of component due to a higher PVOH content.

TABLE 4

Water absorption of gypsum mortars based on TM-1 and aqueous dispersions prepared according to Example 1. The gypsum mortars were cured at different temperatures (see Table). The samples of Exp. No. D-1 and D-2 were applied on EPS-boards following EN520. The samples of Exp. No. D-3 to D-6 were applied on cement-fibre boards which were first treated with an epoxy resin. The amount of PVOH used for making the aqueous dispersions was 11.25 wt. %. The rosin was RO-4 and the resin was RE-2. For further details see text.

| Exp. No. | Rosin [wt. %] | Resin [wt. %] | Curing Temp. [° C.] | H$_2$O abs. [g/m$^2$] | Softening point [° C.] [d] |
|---|---|---|---|---|---|
| D-1 | 70 | 30 | 23° C. | 191 | <50 |
| D-2 (Ref) | 100 | 0 | 23° C. | 678 | 84 |
| D-3 | 100 | 0 | 80° C. [a] | 417 [b] | 84 |
| D-4 | 100 | 0 | 100° C. [a] | 129 [b] | 84 |
| D-5 | 100 | 0 | 100° C. [a] | 131 [c] | 84 |
| D-6 (Ref) | 0 | 0 | 100° C. [a] | 752 [b] | N/A |
| D-7 (Ref) | 0 | 0 | 100° C. [a] | 1,996 [c] | N/A |

[a] The samples were cured in an oven for 2 hrs at the indicated temperature, followed by storing at 23° C. before testing as specified by Example 7.
[b] The samples were placed in the oven directly after application.
[c] The sample was first stored for 3 days at 23° C./50% RH before it was placed in the oven.
[d] The softening points indicated refer to the rosin (if taken alone) and the rosin/resin mixture, respectively.

Again, the component of sample D-1 has a softening point of below 50° C. This explains the surprisingly low water absorption of sample D-1, which is only 28% of that of the reference sample D-2, which contains a component with a softening point of about 87° C. However, if the curing temperature is allowed to be 80° C. for a period of 2 hrs, the water absorption becomes lower. The water absorption can be reduced still further by increasing the curing temperature to 100° C., as shown impressively by samples D-4 and D-5.

The curing can occur in one step at elevated temperature, as shown with sample D-4. However, it was a surprise to find that curing a sample first at 23° C./50% RH followed by a heat treatment as a second curing step resulted in the same low water absorption (see D-5), even when the heat treatment was carried out 3 days afterwards. However, when the two-step curing procedure was performed with a sample without an additive, the water absorption deteriorated strongly, as shown with Example D-7. Thus, when measuring the high water absorption value of 1,996 g/m$^2$, the water even penetrated through the mortar matrix, forming water phases outside the sealed-on ring.

TABLE 5

Water absorption of gypsum mortars based on TM-1 and aqueous dispersions prepared according to Example 1. The gypsum mortars were applied on EPS-boards following EN520 and cured at 23° C., as detailed in Example 7. The amount of PVOH used was 11.25 wt. % and the resin was RE-2. For further details see text.

| Exp. No. | Rosin type | Rosin [wt. %] | Resin [wt. %] | Soft. point [° C.] | Acid No. [mg KOH/g] [e] | H$_2$O abs. [g/m$^2$] |
|---|---|---|---|---|---|---|
| E-1 (Ref) | YT 321 [a] | 75 | 25 | 96 [d] | 8.5 | 928 |
| E-2 (Ref) | YT 341 [b] | 100 | 0 | <20 | 12 | 843 |
| E-3 (Ref) | YT 341 [b] | 75 | 25 | <20 | 12 | 816 |
| E-4 (Ref) | YT 343 [c] | 100 | 0 | <20 | 10 | 794 |
| E-5 (Ref) | YT 343 [c] | 75 | 25 | <20 | 10 | 778 |

[a] The rosin YserTack 321 (YT 321) is a penta ester-modified rosin and a solid at room temperature.
[b] The rosin YserTack 341 (YT 341) is a liquid, triethylene glycol ester-modified rosin having a Brookfield viscosity of 500-600 Pas at 20° C.
[c] The rosin YserTack 343 (YT 343) is a liquid, triethylene glycol ester-modified rosin having a Brookfield viscosity of 25-55 Pas at room temperature.
[d] The softening point of 96° C. refers to the rosin without resin. The softening point of the rosin/resin mixture is below 50° C.
[e] The acid number of the rosin was determined according to DIN EN ISO 2114.

The results from Table 5 demonstrate that rosin derivatives with an acid number of 12 or lower do not reduce the water absorption of the TM-1 mortar, irrespective of whether the rosin derivative has a high or a low softening point and/or whether or not it is employed as a mixture with a resin.

TABLE 6

Water absorption of gypsum mortars based on TM-1 and powder P-2 prepared according to Example 3. The gypsum mortars were applied on EPS-boards following EN520 and cured at 23° C., as detailed in Example 7. For further details see text.

| Exp. No. | Additive | Powder [wt. %] [a] | H$_2$O abs. [g/m$^2$] |
|---|---|---|---|
| A-1 (Ref) | none | 0.0 | 920 |
| F-1 | Powder P-2 | 1.0 | 216 |
| F-2 | Powder P-2 | 2.0 | 138 |

[a] Powder amount added to TM-1, based on the sum of TM-1 and P-2.

The results from Table 6 demonstrate the high efficiency of the additive according to the invention in the form of a powder. Thus, only 1 wt. % of powder P-2 needs to be added to obtain water absorption values of 23% of the comparison sample A-1. And when 2 wt. % of powder P-2 are added, the water absorption is just 15% of the comparison sample A-1. This high efficiency is also attributed to an excellent redispersion of the powder.

Making use of powders such as powder P-2, which is according to the invention, makes it possible to formulate cement-free dry mortar formulations. They are environmentally friendly and easy to handle. When mixed with water, they are readily wettable, they can be neutral in pH, and they show an excellent, creamy consistency. When cured, they are demonstrated to be fully mass hydrophobized, thus repelling water, and they have a significantly reduced water absorption. When subjected to wet conditions, such mortars suffer hardly any negative effect of water. Thus, they are well suited for use in, e.g., wet cells or outdoor applications.

Similar effects are found with mortars containing no mineral binder at all. Thus, the process and the additive according to the invention are also well suited to mortars which are essentially free of cement and gypsum.

The invention claimed is:

1. Process to hydrophobize a mortar which is essentially free of cement, the mortar comprising a hydraulically setting binder, a latent hydraulic binder, a non-hydraulic binder, an organic binder and/or a mineral filler, wherein the mortar contains no or up to 5 wt. % cement, wherein the cement is Portland cement in accordance with EN 197-1 CEM I, II, III, IV, and V, calcium phosphate cement and/or aluminous cement, the process comprising the steps of mixing the mortar with an additive and water and subsequently allowing the mortar to cure, wherein the additive contains a component which is a rosin, a rosin derivative, a mixture of a resin with a rosin, or a mixture of a resin with a rosin derivative, wherein when the softening point of the component is higher than 60° C., the curing step is performed at a temperature that is not lower than the softening point of the component minus 20° C. and when the softening point of the component is 60° C. or lower, the curing step is performed at 40° C. or lower, and wherein the rosin and/or rosin derivative have an acid number of at least 50 mg KOH/g, and when the component is a mixture of a resin with a rosin, or a mixture of a resin with a rosin derivative, the resin at 23° C. and pH 7 has a water solubility of about 5 g/l or less and a Brookfield viscosity of less than 20,000 mPas, measured at 23° C. and 20 rpm.

2. Process of claim 1, wherein the mortar after the step of mixing with the additive and water but before the curing step has a pH of about 10 or lower.

3. Process of claim 1, wherein the additive is used in an amount of about 0.1 to about 10 wt. % of solids, based on the sum of the solids of the mortar and the additive.

4. Process of claim 1, wherein the additive further contains a stabilizer and is in the form of an aqueous dispersion and/or water-dispersible or redispersible solid.

5. Process of claim 4, wherein the stabilizer is a surfactant and/or a water-soluble polymer.

6. Process of claim 5, wherein the weight ratio of the stabilizer to the component is about equal to or lower than 1:2 and/or about equal to or higher than 1:25.

7. Process of claim 1, wherein the resin is selected from the group consisting of hemiterpene, monoterpene, sesquiterpene, phenol resin, polyether, polyester, ester, alcohol, ketone, and formamide resin.

8. Process of claim 1, wherein the component is a mixture of a resin with a rosin or a mixture of a resin with a rosin derivative and the weight ratio of the resin to the rosin and/or rosin derivative is between 70:30 and 2:98.

9. Additive suitable to hydrophobize a cured mortar which is essentially free of cement, the mortar comprising a hydraulically setting binder, a latent hydraulic binder, a non-hydraulic binder, an organic binder and/or a mineral filler, wherein the mortar contains no or up to 5 wt. % cement, wherein the cement is Portland cement in accordance with EN 197-1 CEM I, II, Ill, IV, and V, calcium phosphate cement and/or aluminous cement, the additive comprising a component and a stabilizer,
   a) wherein the component is a rosin derivative, a mixture of a resin with a rosin or a mixture of a resin with a rosin derivative and has a softening point of 60° C. or lower,
   b) the rosin and the rosin derivative have an acid number of at least 50 mg KOH/g, and
   c) when the component is a mixture of a resin with a rosin, or a mixture of a resin with a rosin derivative, the resin at 23° C. and pH 7 has a water solubility of about 5 g/l or less, a Brookfield viscosity of less than 20,000 mPas, measured at 23° C. and 20 rpm, the resin being selected from the group consisting of phenol resin, polyether, polyester, ester, alcohol, ketone, and formamide resin, wherein said additive is in the form of a water-dispersible and/or water-redispersible solid.

10. Pasty mortar composition which is essentially free of cement, wherein the mortar contains no or up to 5 wt. % cement, wherein the cement is Portland cement in accordance with EN 197-1 CEM I, II, Ill, IV, and V, calcium phosphate cement and/or aluminous cement, and the mortar contains a mineral binder selected from the group consisting of gypsum and latent hydraulic binders and/or a mineral filler, an additive, and water, wherein the additive contains a stabilizer and a component, the component being a rosin derivative, a mixture of a resin with a rosin, or a mixture of a resin with a rosin derivative, and
   a) the component has a softening point of 60° C. or lower,
   b) the rosin and the rosin derivative have an acid number of at least 50 mg KOH/g, and
   c) when the component is a mixture of a resin with a rosin, or a mixture of a resin with a rosin derivative, the resin at 23° C. and pH 7 has a water solubility of about 5 g/l or less, a Brookfield viscosity of less than 20,000 mPas, measured at 23° C. and 20 rpm, the resin being selected from the group consisting of phenol resin, polyether, polyester, ester, alcohol, ketone, and formamide resin.

11. Dry mortar composition which is essentially free of cement, the mortar comprising a hydraulically setting binder, a latent hydraulic binder, a non-hydraulic binder, an organic binder and/or a mineral filler, wherein the mortar contains no or up to 5 wt. % cement, wherein the cement is Portland cement in accordance with EN 197-1 CEM I, II, Ill, IV, and V, calcium phosphate cement and/or aluminous cement, and the mortar contains the additive according claim 9.

* * * * *